(12) United States Patent
Chang

(10) Patent No.: US 8,085,625 B2
(45) Date of Patent: Dec. 27, 2011

(54) BURNER SYSTEM CAPABLE OF INVERTING AN OPTICAL DISC AND INVERTER THEREOF

(75) Inventor: Shuo-Wei Chang, Alhambra, CA (US)

(73) Assignee: Vinpower Inc., Alhambra, CA (US)

( * ) Notice: Subject to any disclaimer, the term of this patent is extended or adjusted under 35 U.S.C. 154(b) by 426 days.

(21) Appl. No.: 12/470,674

(22) Filed: May 22, 2009

(65) Prior Publication Data

US 2010/0299683 A1 Nov. 25, 2010

(51) Int. Cl.
*G11B 21/08* (2006.01)
*G11B 17/03* (2006.01)
*G11B 17/04* (2006.01)
*G11B 33/02* (2006.01)

(52) U.S. Cl. .................. 369/30.85; 369/38.87; 369/30.9; 369/90.94; 720/619; 720/622

(58) Field of Classification Search ................ 369/30.85
See application file for complete search history.

(56) References Cited

U.S. PATENT DOCUMENTS

| | | | | | |
|---|---|---|---|---|---|
| 5,036,503 | A | * | 7/1991 | Tomita | 369/30.43 |
| 6,285,648 | B1 | * | 9/2001 | Philipps | 369/200 |
| 6,321,649 | B1 | * | 11/2001 | Vangen et al. | 101/35 |
| 6,545,967 | B2 | * | 4/2003 | Kubokawa | 720/615 |
| 6,990,674 | B1 | * | 1/2006 | Cummins et al. | 720/623 |
| 7,092,320 | B1 | * | 8/2006 | Lee et al. | 369/30.32 |
| 7,448,051 | B2 | * | 11/2008 | Nelson et al. | 720/601 |
| 7,509,660 | B2 | * | 3/2009 | Liu et al. | 720/615 |
| 7,813,246 | B2 | * | 10/2010 | Iguchi et al. | 369/53.37 |
| 2008/0282273 | A1 | * | 11/2008 | Liu et al. | 720/615 |
| 2008/0288969 | A1 | * | 11/2008 | Waiman | 720/615 |

* cited by examiner

*Primary Examiner* — Son Mai
(74) *Attorney, Agent, or Firm* — patenttm.us

(57) ABSTRACT

A burner system capable of inverting an optical disc has a control module, a burning module, a mechanical arm and an inverter. The control module controls the mechanical arm to grab the optical disc from a burner in the burning module and release the optical disc into the inverter. The optical disc passes through the inverter due to gravity, one side of the optical disc is tilted by the inverter so the optical disc is inverted. Therefore, the burner system automatically inverts the optical disc for double-sided data processing.

13 Claims, 7 Drawing Sheets

BURNER SYSTEM CAPABLE OF INVERTING AN OPTICAL DISC AND INVERTER THEREOF

BACKGROUND OF THE INVENTION

1. Field of the Invention

The invention relates to an optical disc burner system and an inverter thereof, in particular, the invention relates to a burner system that is capable of automatically inverting an optical disc for writing data on two distinct sides of the optical disc or respectively writing data and laser labeling on two distinct sides of the optical disc.

2. Description of Related Art

Optical discs are widely used and a popular commodity in today's society. As shown by the multiple conventional optical disc burner systems which can be used to duplicate one or multiple optical discs with data or labeling. These devices include personal computers and dedicated duplication towers and autoloaders.

A personal computer typically comprises of a single writer drive, and therefore can only write one optical disc per burning session. If multiple optical discs are required to be duplicated, then multiple back-to-back burning sessions of one disc at a time must be performed sequentially, with the discs being manually loaded and unloaded.

The duplication tower can be equipped with multiple stacked writer drives which can duplicate multiple optical discs simultaneously to solve the above-mentioned drawback of the personal computer. However, the duplication tower still requires the optical discs to be manually loaded and unloaded.

Therefore, an autoloader, which is comprised with a mechanical arm, may be implemented or integrated with the duplication tower. The mechanical arm automatically loads and unloads the optical discs into the writer drives. However, the conventional optical disc writer drives can only burn onto a single side of the optical disc at a time. Since double-sided optical discs have been developed and sold, such optical discs must be manually inverted for double-sided burning.

Further, technology exists for laser labeling onto the top non-burning side of optical discs which requires the optical discs to be inverted for burning and labeling. When a personal computer with a laser labeling capable writer drive is used to write data on one side of the optical disc and then laser label on the other side of the optical disc, the disc has to be manually inverted for both the duplication and the laser labeling to take place.

According to the above description, although the autoloader can load and unload discs without intervention, the disc must still be manually inverted to write data on both sides of the optical disc or write data on one side and laser label on the opposite side of the optical disc, which is inconvenient and inefficient when utilizing multiple optical discs.

To overcome these shortcomings, the present invention provides a burner system that automatically inverts an optical disc over and an inverter mechanism for the system to mitigate or obviate the aforementioned problems.

SUMMARY OF THE INVENTION

An objective of the invention is to provide an optical disc burner system that can invert an optical disc for automated double-sided processing. During this processing, the burner system inverts an optical disc without manual operation or intervention.

The burner system is comprised of a control module, a burning module, a mechanical arm and an inverter. The control module controls the mechanical arm to pick the optical disc from a burner in the burning module and release the optical disc over the inverter. When the optical disc passes through the inverter, one side of the optical disc is redirected by the inverter so the optical disc becomes inverted.

Based on the above-mentioned descriptions, the optical disc is automatically inverted without manual operation and can therefore increase the disc burning and/or labeling efficiency Furthermore, the mechanism by which the burning module interacts with the mechanical arm in conventional autoloader burner systems can remain unchanged whereas the present invention is an add-on which will greatly reduce the overall cost of production.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
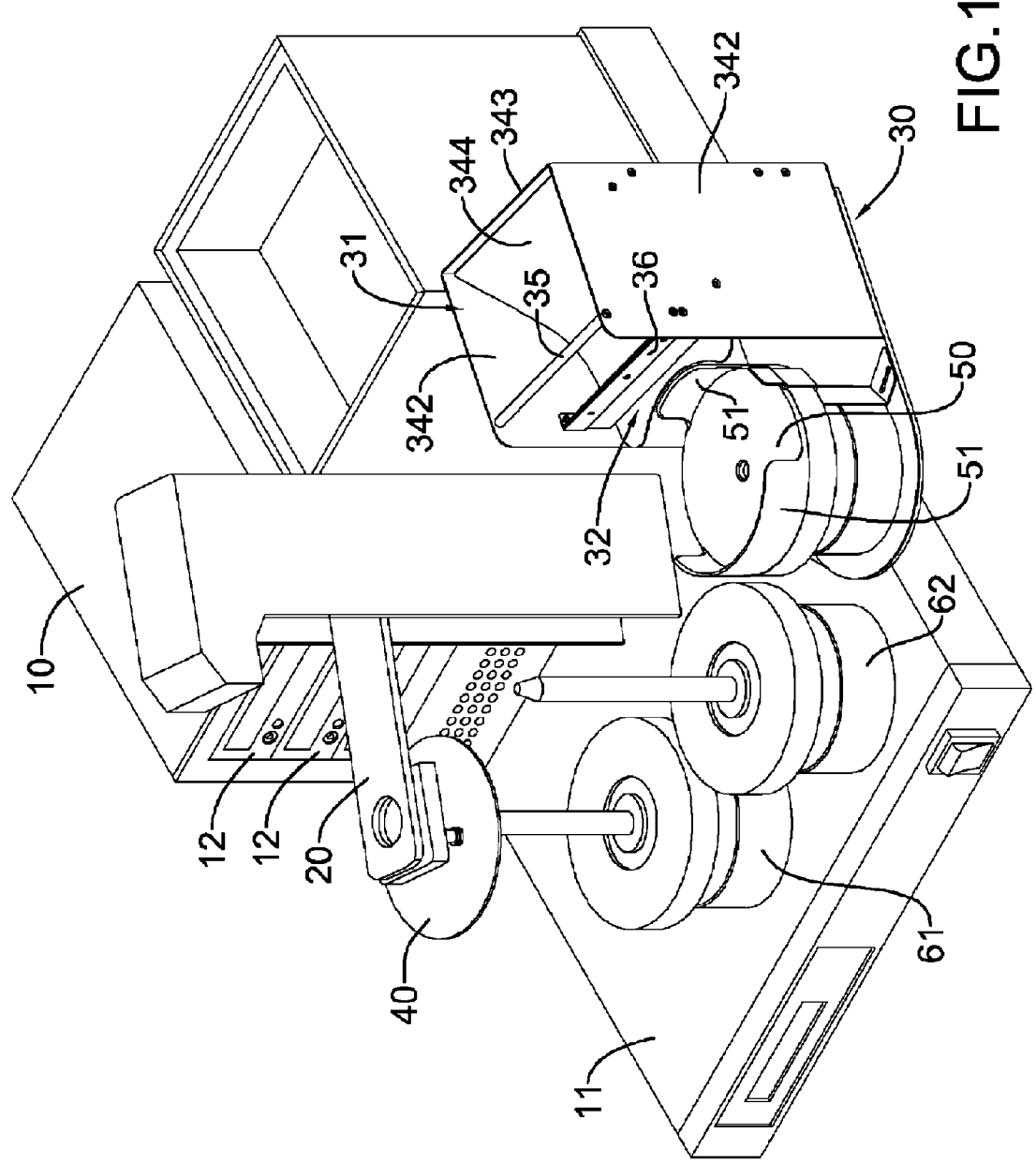
FIG. 1 is an operational perspective view of a burner system capable of inverting an optical disc, showing an optical disc being grabbed and an inverter thereof in accordance with the present invention.

With reference to FIG. 1, a burner system capable of inverting an optical disc (40), the burner system comprises a burning module (10), a control module (11), a mechanical arm (20), and an inverter (30).

The burning module (10) has at least one burner (12) for loading an optical disc. The burning module (10) may be a peripheral device connected to a PC or a standalone device.

The control module (11) is electrically connected to the burning module (10) and controls various optical disc related functions including but not limited to ejecting trays, closing trays, reading optical disc (40), recording optical disc (40) and laser labeling optical disc (40). The control module (11) may control the burning module (10) to perform double-sided data processing, wherein processing comprises data recording on both sides of the optical disc (40) or data recording on one side and laser labeling on the other side of the optical disc (40). Preferably, the control module (11) can control the burning module (10) to write data on one side and create a laser label on the other side. When the burning module (10) is a standalone device, the control module (11) may be embedded inside the burner system. When the burning module (10) is a peripheral device connected to a PC, the control module (11) may be a computer.

The mechanical arm (20) is electrically connected to the control module (11) and controlled by the control module

(11) to perform vertical and horizontal motion. The mechanical arm (20) has a gripping means, that may be, but is not limited to a suction, adhesive or mechanical based gripping means. For example, the mechanical arm (20) using the suction based gripping means may have several suction cups that temporarily adhere to the surface of the optical disc (40) to allow the mechanical arm (20) to move the optical disc (40) from an original position to a designated position. The mechanical arm (20) using the mechanical based gripping means may have a retractable claw that is first mounted through a central hole of the optical disc (40), then expanding to abut a periphery of the central hole and allow the optical disc (40) to be moved.

The inverter (30) has a disc entrance (31) and a disc exit (32), which the disc entrance is reachable by the mechanical arm (20). After the mechanical arm (20) has drawn the optical disc (40) from the tray of a burner (12) of the burning module (10), the optical disc (40) can be deposited in the inverter (30) via the disc entrance (31). The optical disc (40) passes through the inverter (30) due to gravity. One side of the optical disc (40) is retarded and inverts, then continues to pass through the disc exit (32) and eventually reached the disc holder (50). The control module (11) further controls the mechanical arm (20) to move the inverted optical disc (40) back to the tray of the burning module (10) or a designated position.

Figure 2:
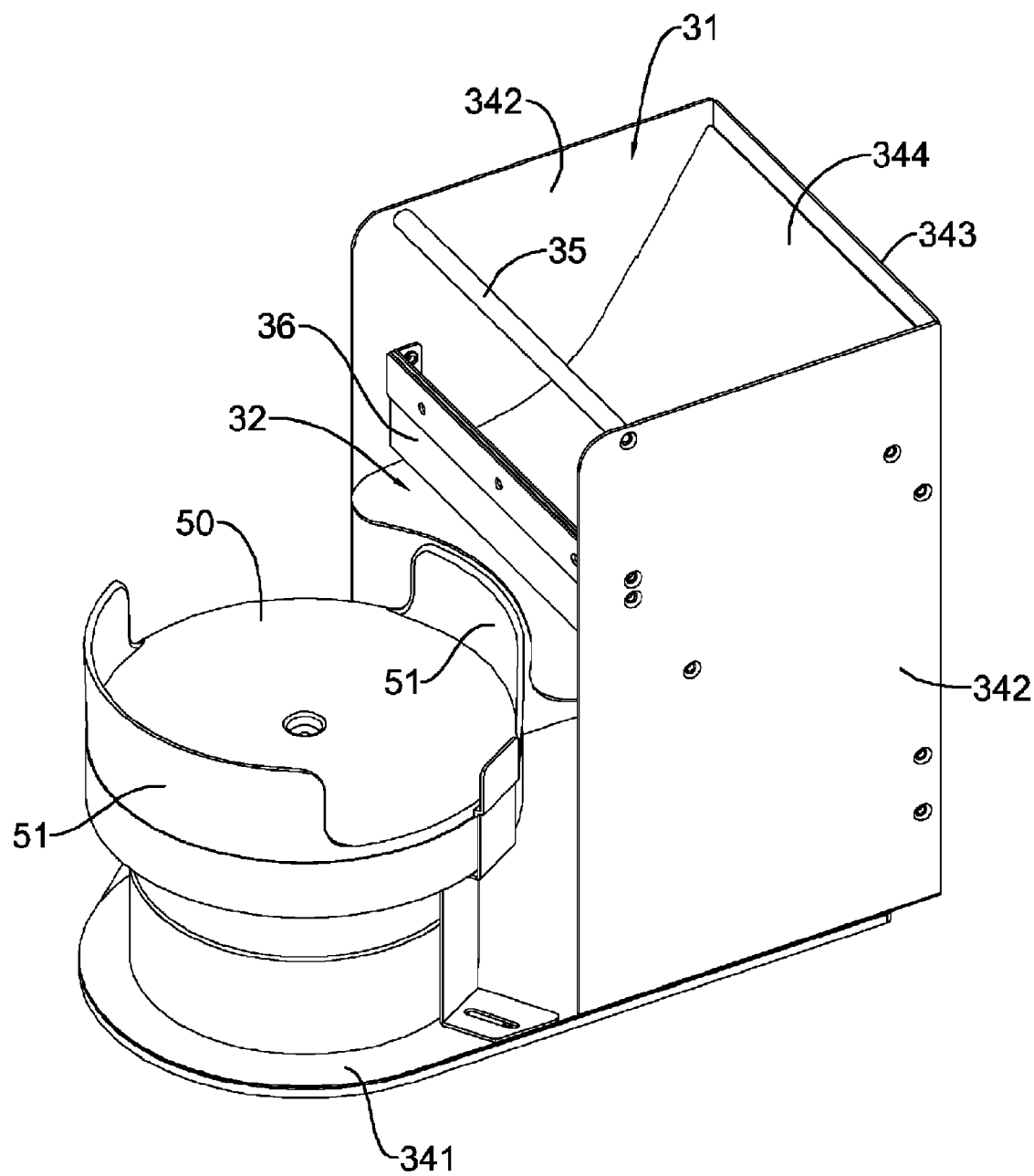
FIG. 2 is an enlarged perspective top view of the inverter in accordance with the present invention.
Figure 3:
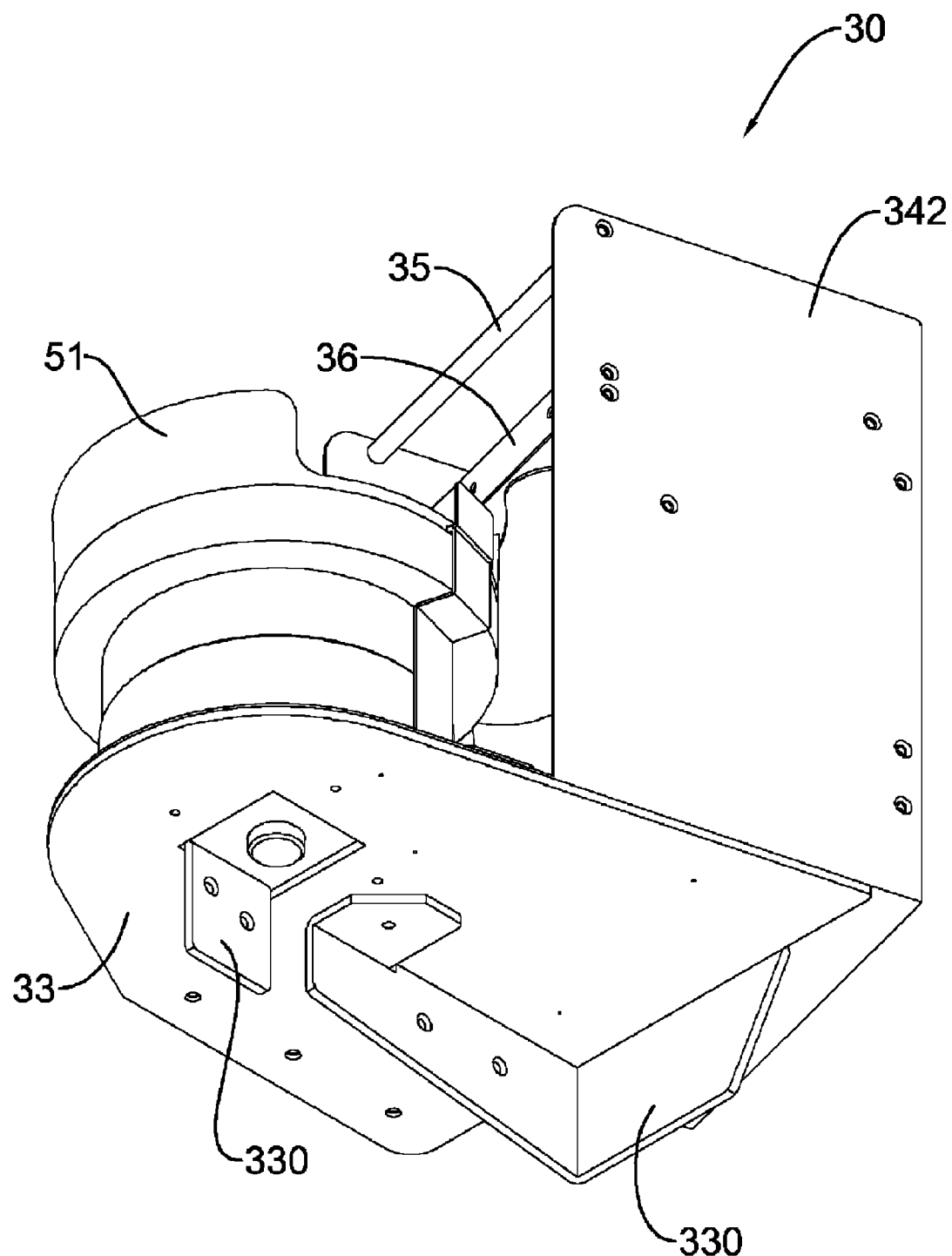
FIG. 3 is a bottom perspective view of the inverter in FIG. 2.
Figure 4:
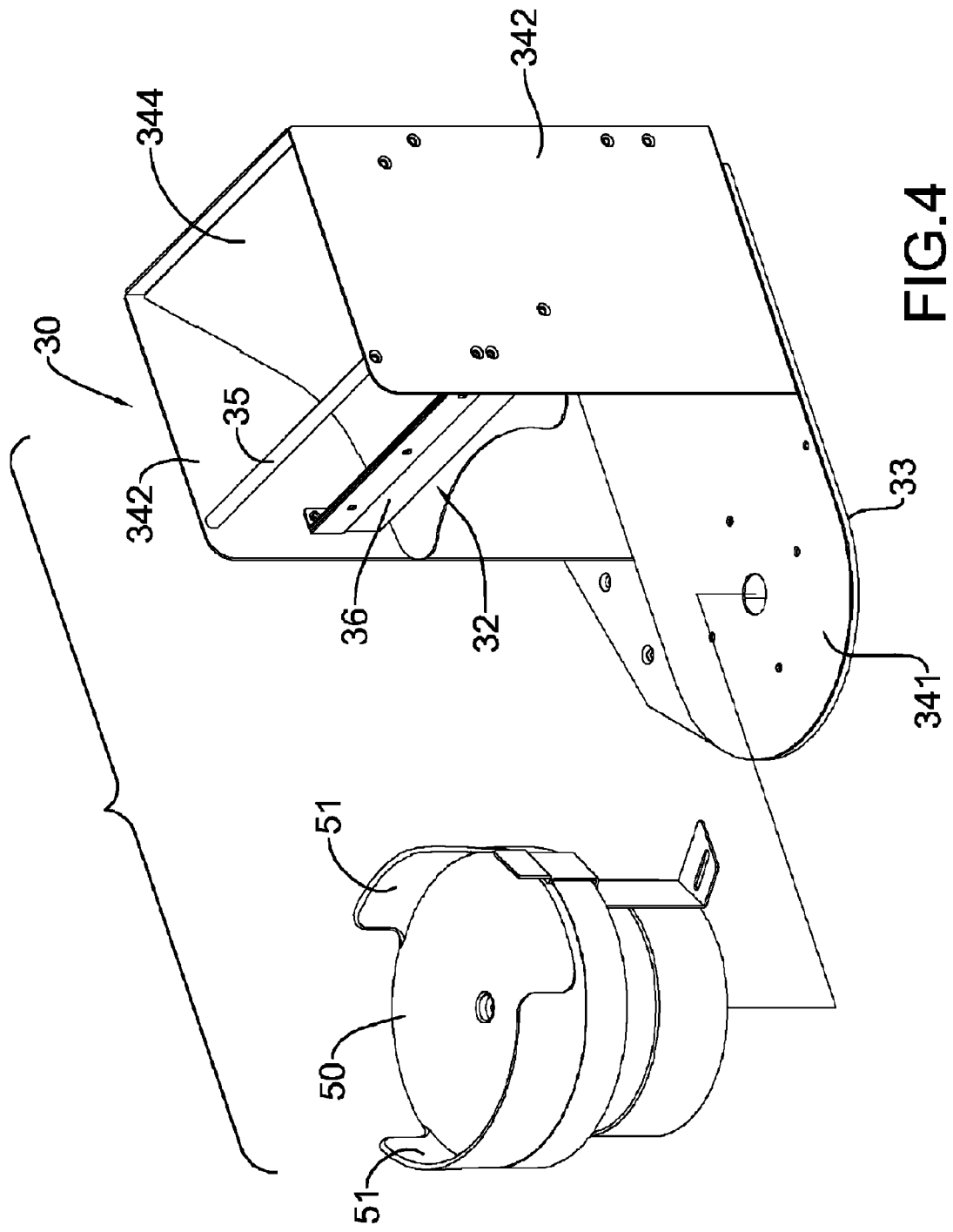
FIG. 4 is a partially exploded perspective exploded view of the inverter in FIG. 2.

With further reference to FIGS. 2 to 4, the inverter (30) may comprise a base (33), a casing, an invert bar (35), and a disc stabilizer (36).

The base (33) has a bottom surface having at least one fixing plate (330) perpendicularly mounted thereto. The at least one fixing plate (330) has at least one hole for a fastening element, such as a screw, to be mounted through for fixing the base (33) securely at a designated position. For example, the base (33) may be fixed on one side of the control module (11).

The casing may be mounted on the base (33) and comprises a bottom panel (341), two side panels (342), a rear panel (343), and a ramp (344). The two side panels (342) are mounted oppositely on and protrude from the bottom panel (341). The rear panel (343) is mounted between the two side panels (342). The ramp (344) is mounted between by the two side panels (342) and is inclined downwards, away from the rear panel (343).

The invert bar (35) is mounted between the two side panels (342), above the ramp (344) and opposite to the rear panel (343).

The disc stabilizer (36) is mounted between the two side panels (342) and between the invert bar (35) and the ramp (344).

The disc entrance (31) may be defined between the two side panels (342), the ramp (344) and the invert bar (35). The disc exit (32) is defined between the invert bar (35) and the ramp (344). The inverter (30) may further comprise an optional disc holder (50) disposed adjacent to the disc exit (32) for stopping, aligning and holding the inverted optical disc (40). The disc holder (50) may be attached securely to the bottom panel (341) and the base (33) using screws. The disc holder (50) has a top surface with a rim, the rim compose of two opposite and separate arc plates (51) perpendicularly protruding upward from the rim. One arc plate (51) is disposed adjacent to the disc exit (32). The two arc plates (51) ensure that the optical disc (40) is held and aligned.

Figure 5:
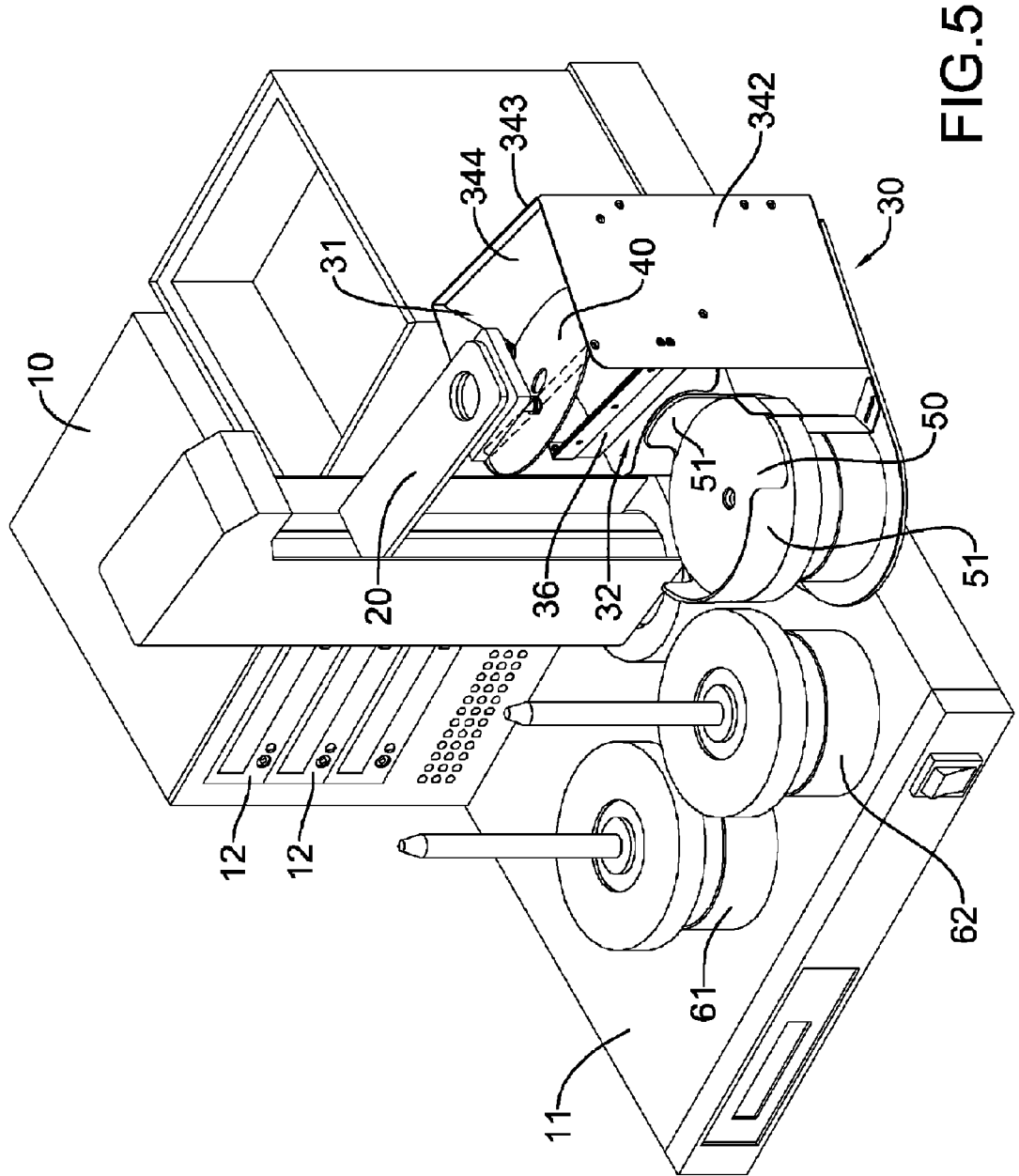
FIG. 5 is an operational perspective view of the burner system in FIG. 1 showing an optical disc being released.
Figure 6:
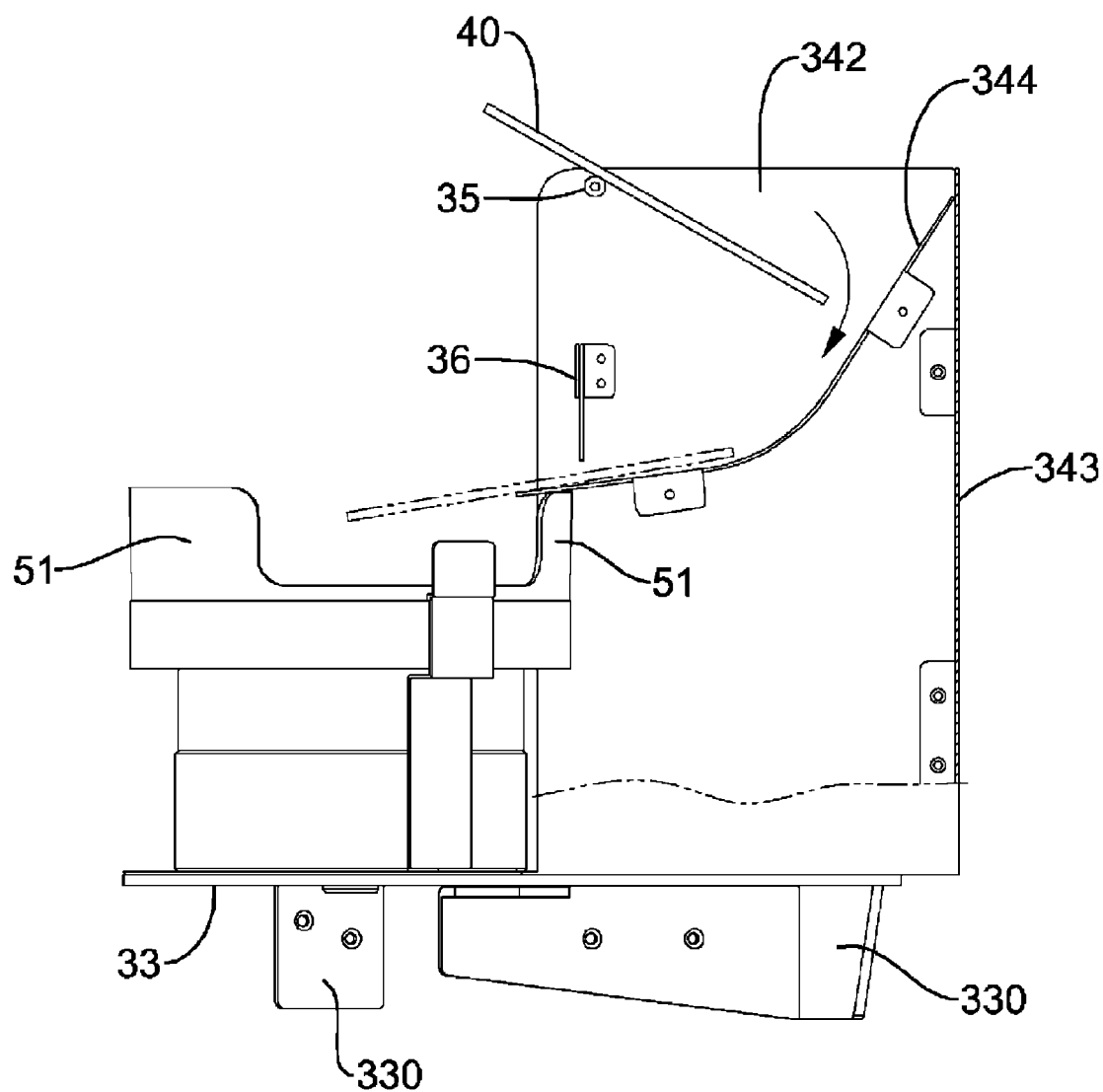
FIG. 6 is an operational side view in partial section of the burner system in FIG. 5, showing the optical disc being placed into the inverter.
Figure 7:
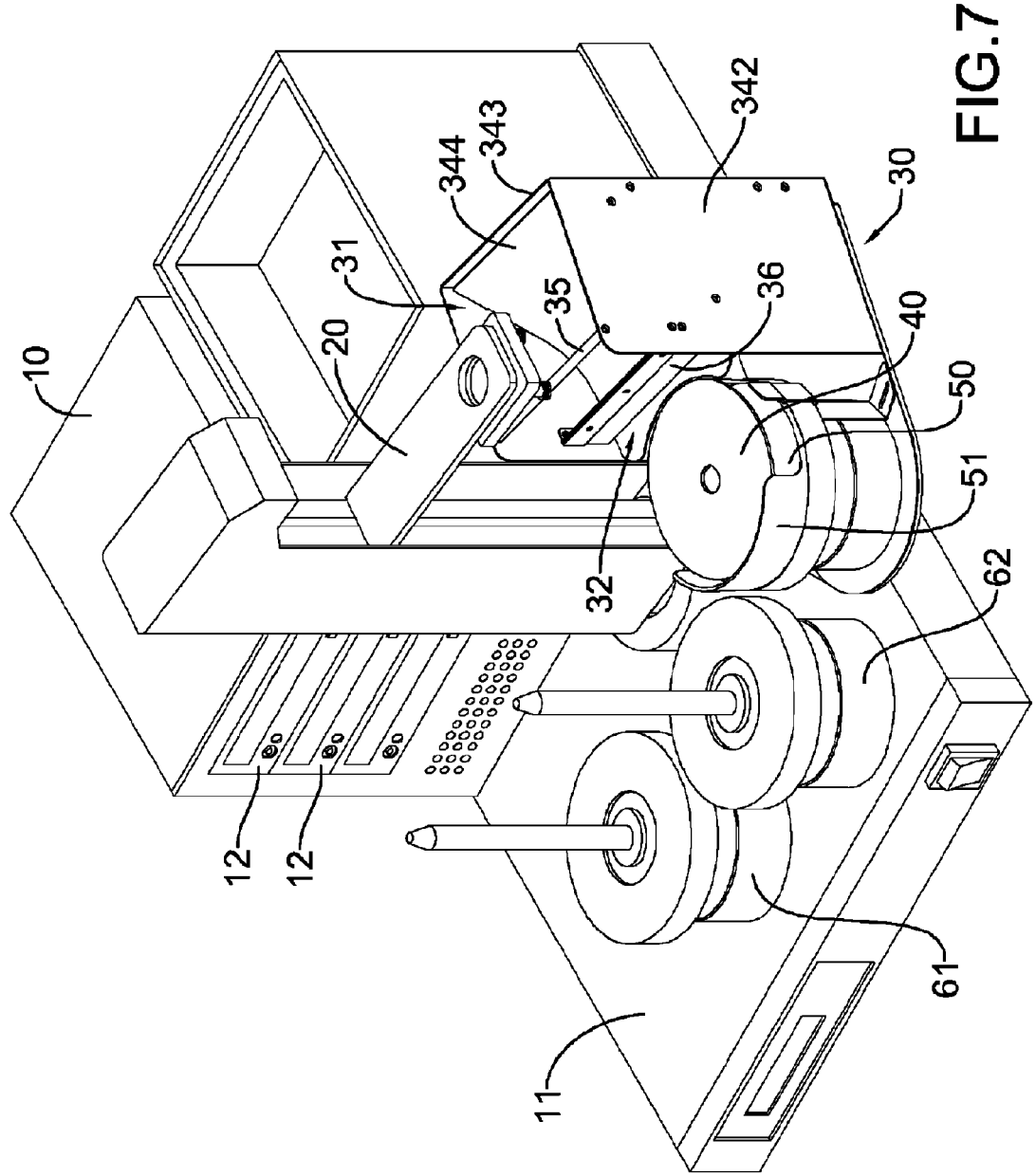
FIG. 7 is an operation perspective view of the burner system in FIG. 1, showing the optical disc completes the inversion process.

For recording, several disc stacks (61), (62) respectively hold multiple optical discs. The positions of the disc stacks (61), (62) are only limited by a reach of the mechanical arm (20). As shown in FIG. 1, after the burning module (10) finishes data recording on one side, the tray of a burner (12) is ejected. The mechanical arm (20) moves over the tray (12) and removes the optical disc (40). With further reference to FIGS. 5 and 6, the mechanical arm (20) moves over to the inverter (30), and once at an appropriate height above the disc entrance (31), the mechanical arm (20) releases the optical disc (40). The optical disc (40) passes into the inverter (30) and one side of the optical disc (40) is tilted by the invert bar (35), causing the optical disc (40) to invert. The inverted optical disc (40) slides along the ramp (344) and passes through the disc exit (32). With further reference to FIG. 7, the inverted optical disc (40) slides into the disc holder (50) and is stopped and aligned by the arc plate (51).

According to the control module (11), the mechanical arm (20) may directly transport the optical disc (40) back to the burning module (10) for performing subsequent laser labeling or writing on a second side, move the optical disc (40) to a designated disc stack (61), (62) for storage. Once a designated number is reached, optical discs (40) in the disc stack (61), (62) may be moved to the burning module (10) for laser labeling or writing in sequence.

In summary, the burner system can invert the optical disc (40) efficiently. The system designer only needs design a moving path of the mechanical arm and an appropriate flow process. Then, the optical disc can be automatically removed from the burning module (10) to the inverter (30) for inverting. Further, the burner system can be applied to double-sided processes such as data writing on both sides or data writing and laser labeling on respective sides of the optical disc (40).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A burner system capable of inverting an optical disc comprising:
    a burning module having at least one burner;
    a control module electrically connected to and controlling the burning module to perform optical disc related operations;
    a mechanical arm electrically connected to and controlled by the control module for robotic movement; and
    an inverter having a disc entrance, a disc exit and a disc holder, which the disc entrance and the disc holder are reachable by the mechanical arm;
    wherein, the control module controls the mechanical arm to draw the optical disc from the tray ejected from the burning module and deposit the optical disc into the inverter via the disc entrance, the optical disc is moved due to gravity and one side of the optical disc is tilted by the inverter causing the optical disc to be inverted, then properly sits on the disc holder of the inverter, and the control module further controls the mechanical arm to take inverted optical disc on the disc holder to a designated position.

2. The burner system as claimed in claim 1, wherein the inverter comprises:
    a casing comprising
        a bottom panel;
        two side panels oppositely mounted on and protruding from the bottom panel;
        a rear panel mounted between the two side panels; and a ramp mounted between the two side panels and inclined downwards, away from the rear panel;

an invert bar mounted between the two side panels and above the ramp; and a disc stabilizer mounted between the two side panels and between the invert bar and the ramp, wherein the disc entrance is defined between the side panels, ramp and invert bar, and the disc exit is defined between the disc stabilizer and the disc holder.

3. The burner system as claimed in claim 2, wherein the inverter further comprises:

a base having a bottom surface having at least one fixing plate mounted perpendicularly to the bottom surface of the base and having at least one hole, wherein the casing is mounted on the base.

4. The burner system as claimed in claim 2, wherein the disc holder is disposed adjacent to the disc exit and has a top surface with a rim, the rim has two opposite and separate arc plates perpendicularly protruding upwards from the rim.

5. The burner system as claimed in claim 3, wherein the disc holder is disposed adjacent to the disc exit and has a top surface with a rim, the rim has two opposite and separate arc plates perpendicularly protruding upwards from the rim.

6. The burner system as claimed in claim 4, wherein the control module is a standalone device.

7. The burner system as claimed in claim 5, wherein the control module is a standalone device.

8. The burner system as claimed in claim 4, wherein the control module is a computer.

9. The burner system as claimed in claim 5, wherein the control module is a computer.

10. An inverter for an optical disc burner system, the inverter comprising:

a casing comprising
- a bottom panel;
- two side panels oppositely mounted on and protruding from the bottom panel;
- a rear panel mounted between the two side panels; and
- a ramp mounted between the two side panels and inclined downwards, away from the rear panel; and an invert bar mounted between the two side panels and above the ramp;

a disc stabilizer mounted between the two side panels and between the invert bar and the ramp;

a disc holder;

a disc entrance defined between the side panels, ramp and invert bar; and a disc exit defined between the disc stabilizer and the disc holder.

11. The inverter as claimed in claim 10, wherein the inverter further comprises a base having a bottom surface having at least one fixing plate mounted perpendicularly to the bottom surface of the base and having at least one hole, wherein the casing is mounted on the base.

12. The inverter as claimed in claim 10, wherein the disc holder is disposed adjacent to the disc exit and has a top surface with a rim, the rim has two opposite and separate arc plates perpendicularly protruding upwards from the rim.

13. The inverter as claimed in claim 11, wherein the disc holder is disposed adjacent to the disc exit and has a top surface with a rim, the rim has two opposite and separate arc plates perpendicularly protruding upwards from the rim.

* * * * *